(12) United States Patent
Hao et al.

(10) Patent No.: US 11,211,806 B2
(45) Date of Patent: Dec. 28, 2021

(54) POWER SUPPLY METHOD, POWER SUPPLY DEVICE, AND ELECTRONIC DEVICE

(71) Applicant: SZ DJI OSMO TECHNOLOGY CO., LTD., Shenzhen (CN)

(72) Inventors: Yi Hao, Shenzhen (CN); Feng Zhu, Shenzhen (CN)

(73) Assignee: SZ DJI OSMO TECHNOLOGY CO., LTD., Shenzhen (CN)

(*) Notice: Subject to any disclaimer, the term of this patent is extended or adjusted under 35 U.S.C. 154(b) by 174 days.

(21) Appl. No.: 16/537,968

(22) Filed: Aug. 12, 2019

(65) Prior Publication Data

US 2019/0363561 A1    Nov. 28, 2019

Related U.S. Application Data

(63) Continuation of application No. PCT/CN2017/073827, filed on Feb. 16, 2017.

(51) Int. Cl.
*H02J 7/00* (2006.01)

(52) U.S. Cl.
CPC .......... *H02J 7/0063* (2013.01); *H02J 7/0025* (2020.01); *H02J 2310/22* (2020.01)

(58) Field of Classification Search
CPC ........ H02J 7/00; H02J 7/0025; H02J 2310/22; H02J 7/0063
USPC ....... 320/137, 136, 135, 134, 128, 127, 126, 320/119, 122, 107, 103; 307/80
See application file for complete search history.

(56) References Cited

U.S. PATENT DOCUMENTS

| 8,482,260 B2 | 7/2013 | Hsieh et al. |
| 9,641,002 B2 * | 5/2017 | Lavender ............. H02J 7/0045 |
| 2016/0352141 A1 | 12/2016 | Cheng et al. |

FOREIGN PATENT DOCUMENTS

| CN | 1625278 A | 6/2005 |
| CN | 1805240 A | 7/2006 |
| CN | 202197144 U | 4/2012 |
| CN | 102694212 A | 9/2012 |
| CN | 102931720 A | 2/2013 |
| CN | 104617652 A | 5/2015 |
| CN | 105305572 A | 2/2016 |
| CN | 105610215 A | 5/2016 |
| CN | 105656097 A | 6/2016 |
| CN | 105703439 A | 6/2016 |

OTHER PUBLICATIONS

The World Intellectual Property Organization (WIPO) International Search Report for PCT/CN2017/073827 dated Nov. 23, 2017 5 Pages.

* cited by examiner

*Primary Examiner* — Arnold M Kinkead
(74) *Attorney, Agent, or Firm* — Anova Law Group, PLLC

(57) ABSTRACT

A power supply method includes detecting whether a battery is newly connected to an unused battery interface of an electronic device during operation of the electronic device. The power supply method also includes, based on detecting that the battery is newly connected to the unused battery interface, and determining that a capacity of the newly connected battery is greater than a capacity of a currently operating battery, controlling the newly connected battery to function as an operating battery to provide an electric power to the electronic device.

18 Claims, 14 Drawing Sheets

POWER SUPPLY METHOD, POWER SUPPLY DEVICE, AND ELECTRONIC DEVICE

CROSS-REFERENCE TO RELATED APPLICATION

This application is a continuation application of International Application No. PCT/CN2017/073827, filed on Feb. 16, 2017, the entire content of which is incorporated herein by reference.

TECHNICAL FIELD

The present disclosure relates to the technology field of electronic devices and, more particularly, to a power supply method, a power supply device, and an electronic device.

BACKGROUND

In related technologies, when replacing a battery, a movable electronic device needs to first shut down. This may interrupt the operations of the electronic device, such as the continuity of data transmission, which may result in loss of data. When an external battery is connected to the electronic device during the operations of the electronic device, the external battery may not be able to provide the electric power to the electronic device to extend the operation time of the electronic device.

SUMMARY

In accordance with an aspect of the present disclosure, there is provided a power supply method. The power supply method includes detecting whether a battery is newly connected to an unused battery interface of an electronic device during operation of the electronic device. The power supply method also includes, based on detecting that the battery is newly connected to the unused battery interface, and determining that a capacity of the newly connected battery is greater than a capacity of a currently operating battery, controlling the newly connected battery to function as an operating battery to provide an electric power to the electronic device.

In accordance with another aspect of the present disclosure, there is also provided an electronic device. The electronic device includes a main body including at least two battery interfaces, each battery interface configured to provide an electric power to the electronic device when connected with an operating battery. The electronic device also includes a power source circuit and a processor both disposed within the main body, the power source circuit configured to provide the electric power to the electronic device through the operating battery. The processor is also configured to detect whether a battery is newly connected to an unused battery interface of the at least two battery interfaces during operation of the electronic device. The processor is also configured to, based on detecting that the battery is newly connected to the unused battery interface, control the newly connected battery to function as the operating battery to provide the electric power to the electronic device based on determining that a capacity of the newly connected battery is greater than or equal to a capacity of a currently operating battery.

According to the power supply method, power supply device, and electronic device of the present disclosure, before replacing the currently operating battery, a newly connected battery may provide electric power to the electronic device, such that the electronic device is not shut down when the currently operating battery is replaced. Thus, the continuity in data transmission is ensured, and data loss is avoided. In addition, the newly connected battery can provide electric power to the electronic device, thereby extending the operating time of the electronic device.

The additional features and advantages of the present disclosure will be reflected in the following descriptions. Some of the features and advantages may become clearer in the following descriptions, or may be understood from practice of the present disclosure.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

The power supply method of the present disclosure may be implemented to supply an electric power to an electronic device. The electronic device may include at least two battery interfaces. Each battery interface may be configured to connect a battery and to independently or individually provide the electric power to the electronic device. The electronic device may include an unmanned aerial vehicle, a cell phone, a tablet, a remote control device, a gimbal, or an aerial surveillance device, etc. The present disclosure does not limit the electronic device. Any device that may is powered by a battery may be an electronic device.

Figure 1:
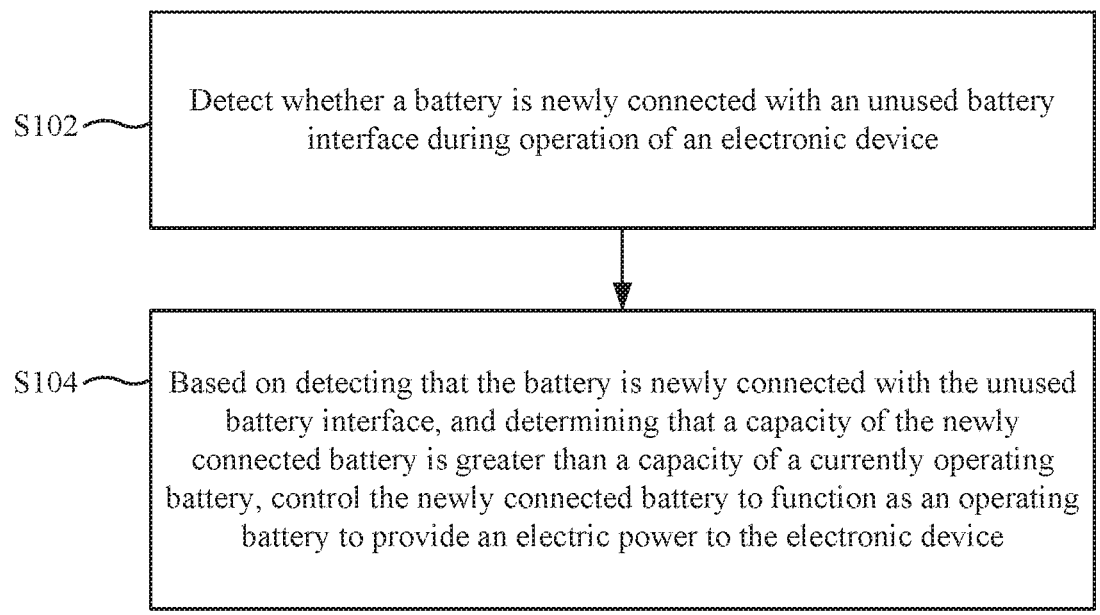
FIG. 1 is a flow chart illustrating a power supply method, according to an example embodiment.

Referring to FIG. 1, an embodiment of the disclosed power supply method may include:

S102: detecting whether a battery is newly connected with an unused battery interface during operation of an electronic device;

S104: based on detecting that the battery is newly connected with the unused battery interface, and determining that a capacity of the newly connected battery is greater than a capacity of a currently operating battery, controlling the newly connected battery to function as an operating battery to provide an electric power to the electronic device.

Figure 2:
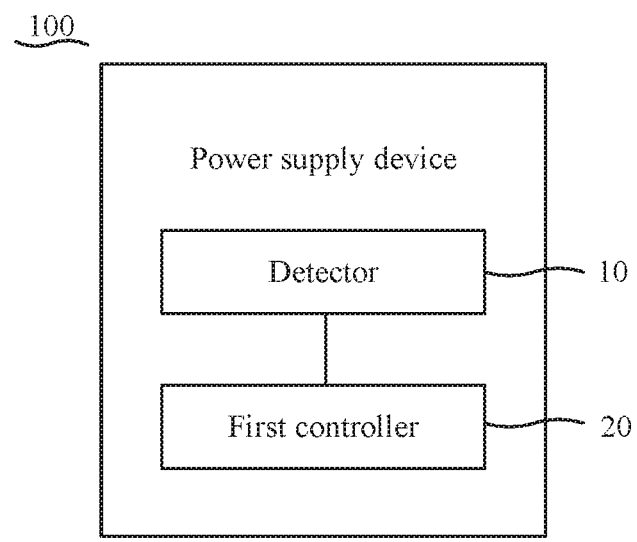
FIG. 2 is a schematic diagram of a power supply device, according to another example embodiment.

Referring to FIG. 2, a power supply device 100 may include a detector 10 and a first controller 20. In some embodiments, the power supply methods of the present disclosure may be executed by the power supply device 100.

For example, step S102 may be performed by the detector 10, and step S104 may be performed by the first controller 20. In other words, the detector 10 may be configured to detect a battery is newly connected with an unused battery interface of the power supply device 100 during operation of an electronic device. Based on detecting that the battery is newly connected with the unused battery interface, and determining that a capacity of the newly connected battery is greater than a capacity of a currently operating battery, the first controller 20 may be configured to control the newly connected battery to function as an operating battery to provide an electric power to the electronic device.

In the disclosed power supply method and power supply device 100, when replacing the currently operating battery, the newly connected battery may be configured to provide the electric power to the electronic device, such that the electronic device need not be shut down when the currently operating battery is replaced. As a result, data transmission continuity can be maintained, and data loss can be avoided.

In some embodiments, during the operation of the electronic device, at least one operating battery may provide the electric power to the electronic device. The number of the operating batteries may be one or two, or more than two. In other words, in some embodiments, two or more operating batteries may provide the electric power to the electronic device simultaneously.

In some embodiments, the operating battery is a battery that is providing the electric power to the electronic device. When batteries are connected with one or more battery interfaces, the batteries may be placed in an activated or connected state, but a battery connected with a battery interface may not be providing the electric power to the electronic device (that is, it may stand by). When the currently operating battery (a battery that's currently providing the electric power) is removed or malfunctions, placing the batteries in a connected or activated state may enable quick switch to one or more other batteries to function as the operating battery to provide the electric power to the electronic device. The unused battery interface is a battery interface that is not connected with a battery, or a battery interface that is connected with a battery but is not providing the electric power to the electronic device.

In some embodiments, to select a battery having the greatest capacity to provide the electric power to the electronic device, the electronic device may be connected with one or more batteries to obtain, in real time or periodically, parameter information related to the connected batteries, such as an updated capacity of each battery. All of the batteries, whether being operating battery or non-operating battery, may be connected with the electronic device. Then, when the currently operating battery is disconnected, one or more other batteries may instantly switch to become an operating battery to provide the electric power to the electronic device, thereby avoiding power interruption. In addition, every time a battery is newly connected, the newly connected battery is placed in an activated state. Accordingly, the operation time of the electronic device may be extended with multiple batteries operating in tandem.

In some embodiments, the power supply device 100 may include four battery interfaces configured to connect four batteries to simultaneously provide the electric power to the electronic device. One of the four battery interfaces may be connected to a battery. In other words, one of the four battery interfaces may be currently connected with a battery. The other three battery interfaces may be unused battery interfaces (e.g., not connected with a battery).

In some embodiments, when replacing a currently operating battery (e.g., a battery that is already connected to the electronic device and is providing electric power to the electronic device), another battery may be connected with one of the three unused battery interfaces. If a capacity of the newly connected battery is greater than a capacity of the currently operating battery, then the newly connected battery may be controlled to function as an operating battery to provide the electric power to the electronic device. A user may detach a battery having a relatively small capacity from the electronic device and recharge the detached battery. As such, the electronic device may continuously operate during the battery replacement process.

Figure 3:
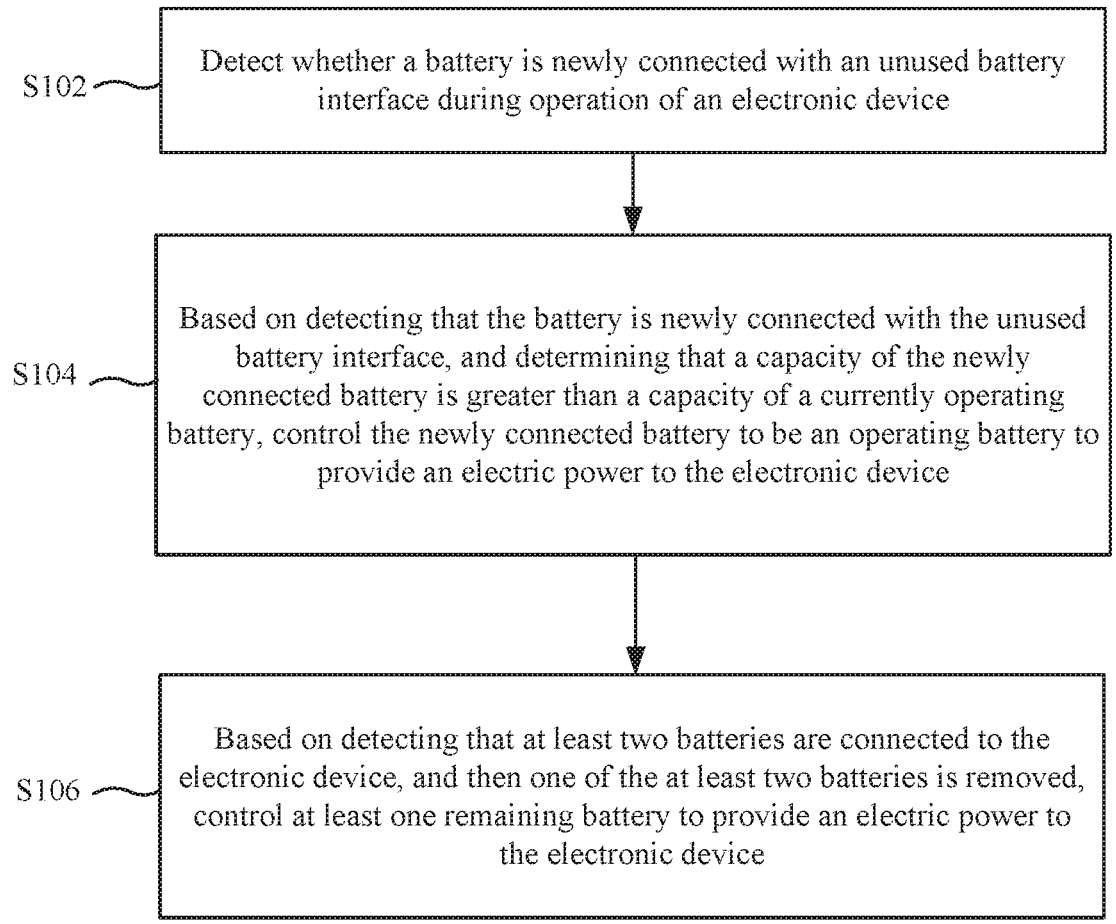
FIG. 3 is a flow chart illustrating a power supply method, according to another example embodiment.

Referring to FIG. 3, in some embodiments, the power supply method may also include:

S106: based on detecting that at least two batteries are connected to the electronic device, and then one of the at least two batteries is removed, controlling at least one remaining battery to provide an electric power to the electronic device.

The step S106 may be executed by the first controller 20. That is, when the electronic device is connected with at least two batteries, and when one of the batteries is removed, the first controller 20 may control one or more remaining batteries to provide the electric power to the electronic device.

In some embodiments, the one or more remaining batteries may provide the electric power to continue the operations of the electronic device. For example, when the electronic device is connected with three batteries, and when one of the batteries is removed, the first controller 20 may control the remaining two batteries to provide electric power to the electronic device.

In some embodiments, step S106 may be executed after step S104. In other embodiments, step S106 may be executed before step S102, or between steps S102 and S104.

In some embodiments, step S106 may include:

based on determining that the removed battery is an operating battery, controlling one of the remaining batteries having the greatest capacity to function as an operating battery to provide the electric power to the electronic device.

In some embodiments, the step of if the removed battery is an operating battery, controlling one of the remaining batteries having the greatest capacity to function as an operating battery to provide the electric power to the electronic device, may be executed by the first controller 20. In other words, when the removed battery is an operating battery, the first controller 20 may be configured to control one of the remaining batteries having the greatest capacity to function as an operating battery to provide the electric power to the electronic device. In some embodiments, when a battery is removed, the first controller 20 may automatically switch to a battery of the remaining batteries having the greatest capacity to provide the electric power. When there are one or more batteries having the greatest capacity, the first controller 20 may control the one or more batteries having the greatest capacity to simultaneously provide the electric power.

As such, the electronic device may operate for a longer time period before the next battery replacement. For example, when there are two remaining batteries, one having a capacity of 100%, the other having a capacity of 80%, the first controller 20 may control the battery having the capacity of 100% to provide the electric power to the electronic device.

In some embodiments, when a battery is providing the electric power to the electronic device, and when the battery is removed, the electronic device may initiate a shut down process due to the loss of the power supply. However, in the disclosed embodiments, the response time for the two remaining batteries to provide electric power to the electronic device is shorter than the time period needed for initiating the shut down process. Thus, before the electronic device is shut down, the power supply can be restored, and the electronic device can continue to operate.

Figure 4:
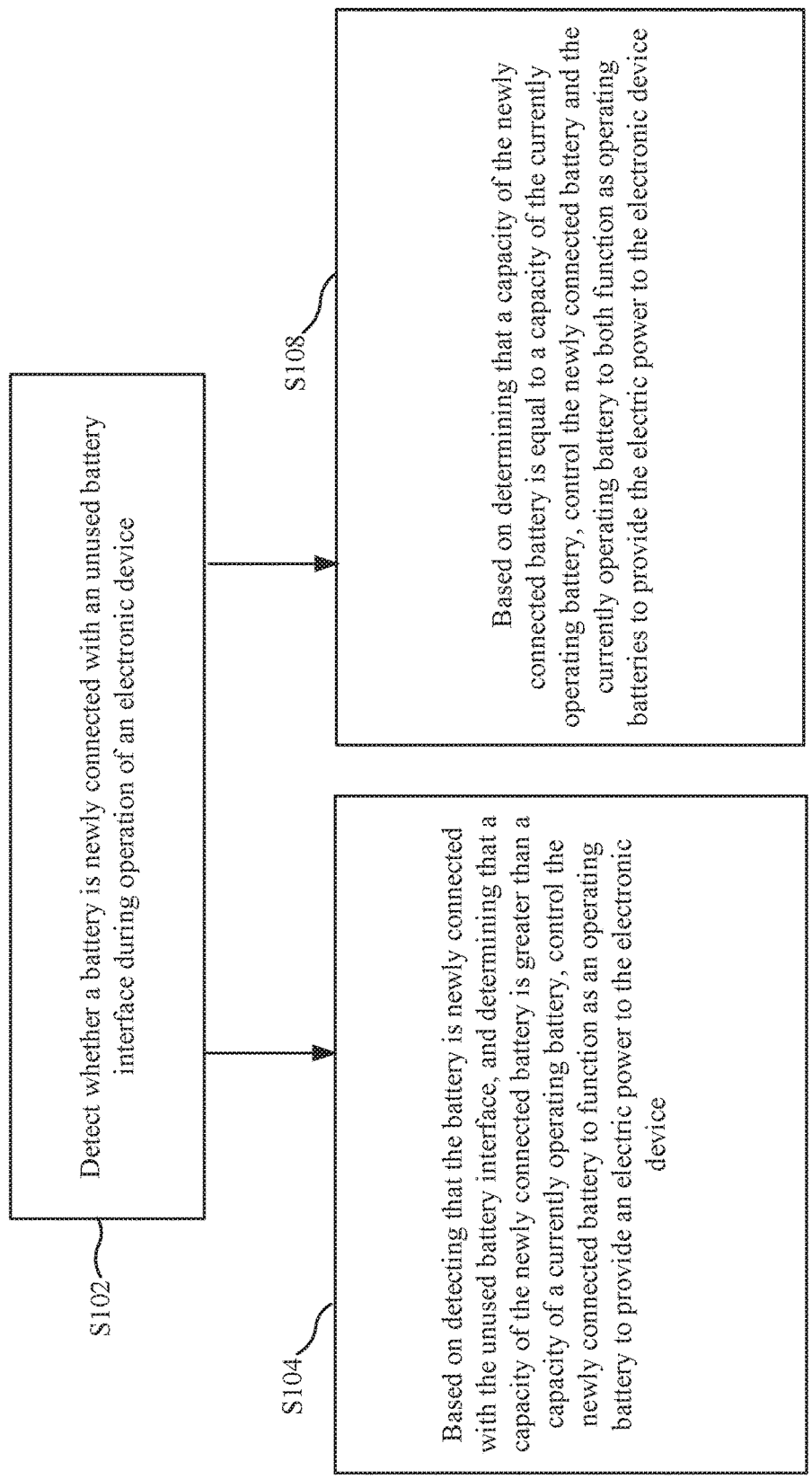
FIG. 4 is a flow chart illustrating a power supply method, according to another example embodiment.
Figure 5:
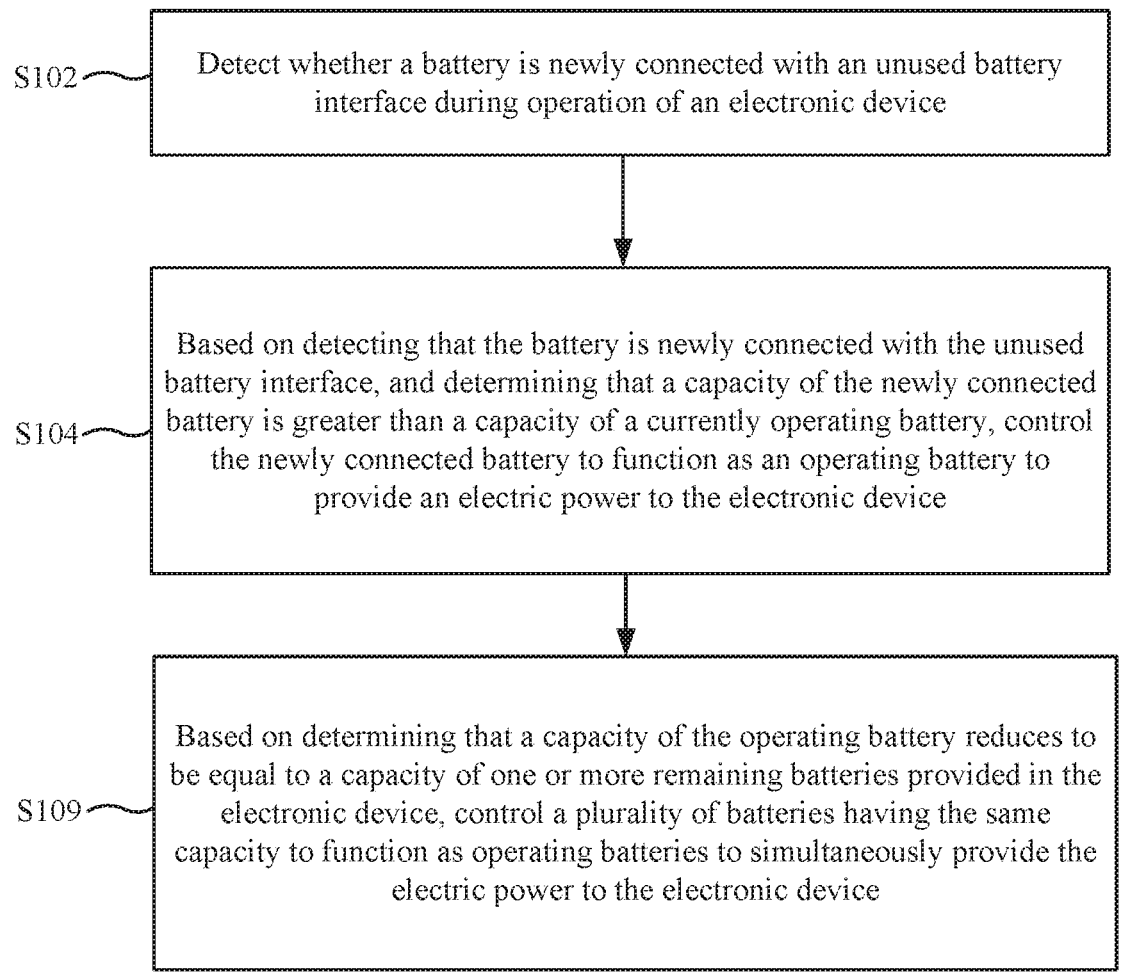
FIG. 5 is a flow chart illustrating a power supply method, according to another example embodiment.

Referring to FIG. 4, in some embodiments, the power supply method may include:

S108: based on determining that a capacity of the newly connected battery is equal to a capacity of the currently operating battery, controlling the newly connected battery and the currently operating battery to both function as operating batteries to provide the electric power to the electronic device.

In some embodiments, step S108 may be executed by the first controller 20. In other words, when the capacity of the newly connected battery is equal to the capacity of the currently operating battery, the first controller 20 may control the newly connected battery and the currently operating battery to both function as operating batteries to provide the electric power to the electronic device.

As such, multiple batteries may be configured to simultaneously provide the electric power to the electronic device, thereby enhancing the continuous operating capability of the electronic device. For example, when the remaining capacity of the currently operating battery is 60%, and if the capacity of the newly connected battery is also 60%, then the currently operating battery and the newly connected battery may be controlled to both provide the electric power to the electronic device.

In some embodiments, step S108 may be executed after step S104. In other embodiments, step 108 may be executed before step S102, or may be executed between steps S102 and S104.

In some embodiments, the power supply method may also include:

S109: based on determining that a capacity of the operating battery reduces to be equal to a capacity of one or more remaining batteries provided in the electronic device, controlling a plurality of batteries having the same capacity to function as operating batteries to provide the electric power to the electronic device.

In some embodiments, step S109 may be executed by the first controller 20. In other words, when the capacity of the operating battery reduces to be equal to the capacity of one or more remaining batteries provided in the electronic device, the first controller 20 may be configured to control a plurality of batteries (including the operating battery and the one or more remaining batteries) having the same capacity to function as operating batteries to simultaneously provide the electric power to the electronic device.

For example, the electronic device may be provided with three batteries. One of the three batteries may be an operating battery, which may have a capacity of 80%. The remaining two batteries may have a capacity of 60% and 50% respectively.

Then, when the capacity of the operating battery reduces to 60%, the two batteries both having a capacity of 60% may simultaneously provide the electric power to the electronic device. When the capacities of the two batteries both reduce from a capacity of 60% to a capacity of 50%, the three batteries may simultaneously provide the electric power to the electronic device.

In some embodiments, step S109 may be executed after step S104. In other embodiments, step S109 may be executed before step S102, or between the steps S102 and S104.

Figure 6:
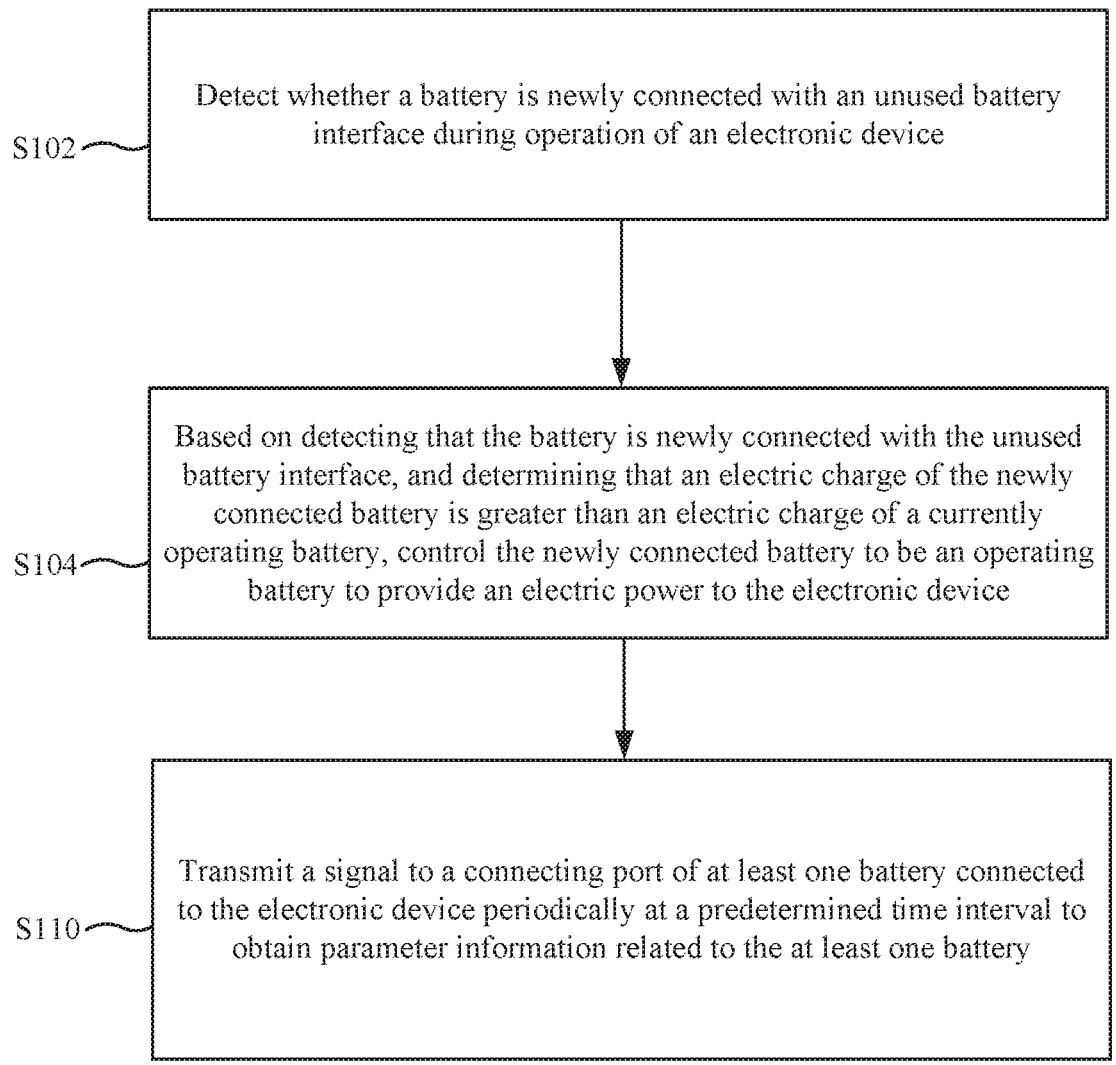
FIG. 6 is a flow chart illustrating a power supply method, according to another example embodiment.

Referring to FIG. 6, in some embodiments, the power supply method may include:

S110: transmitting a signal to a connecting port of at least one battery connected to the electronic device periodically at a predetermined time interval to obtain parameter information related to the at least one battery.

Figure 7:
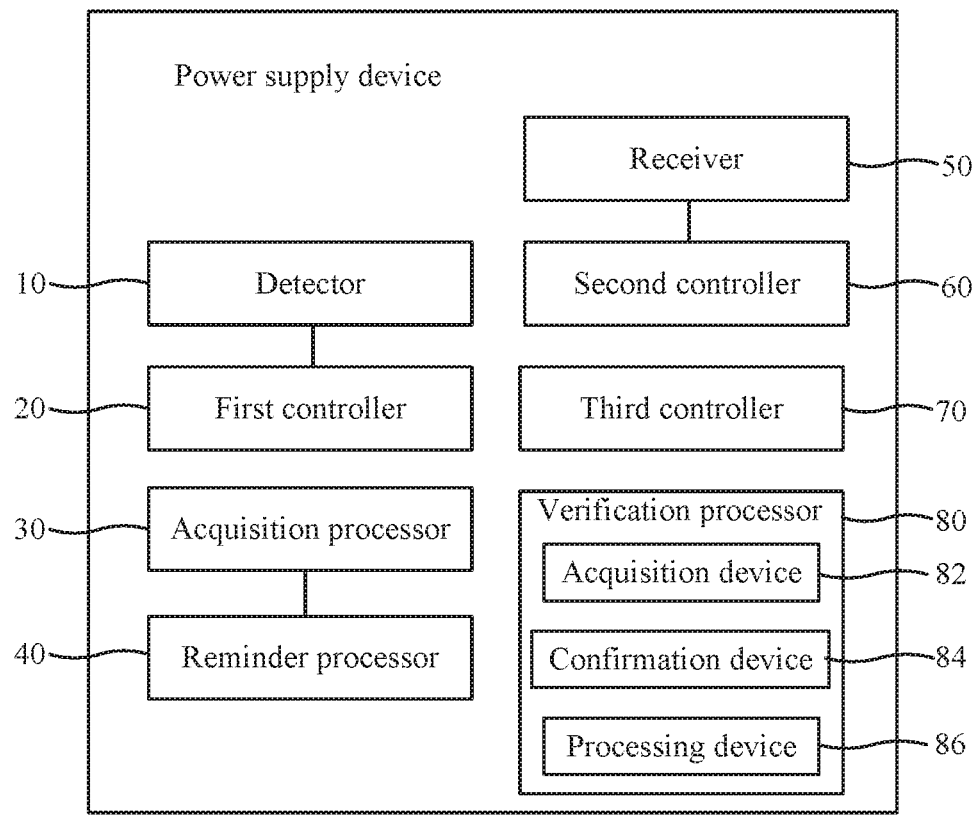
FIG. 7 is a schematic diagram of a power supply device, according to another example embodiment.

Referring to FIG. 7, in some embodiments, the power supply device 100 may include an acquisition processor 30. Step S110 may be executed by the acquisition processor 30. In other words, the acquisition processor 30 may be configured to transmit a signal to the connecting port of a battery (e.g., any battery connected to the electronic device) periodically at a predetermined time interval to obtain parameter information related to the at least one battery.

As such, the operation status of any battery connected with the electronic device may be monitored at any time. Accordingly, the battery may be controlled to discharge or to stop discharging. For example, the predetermined time interval may be 2 seconds (or any other suitable time period). In every 2 seconds, the acquisition processor 30 may transmit a signal to the connecting port of the battery to obtain parameter information related to the battery.

In some embodiments, the parameter information related to the at least one battery may include at least one of a capacity of the battery, a voltage of the battery, a current of the battery, or a discharging power of the battery.

Figure 8:
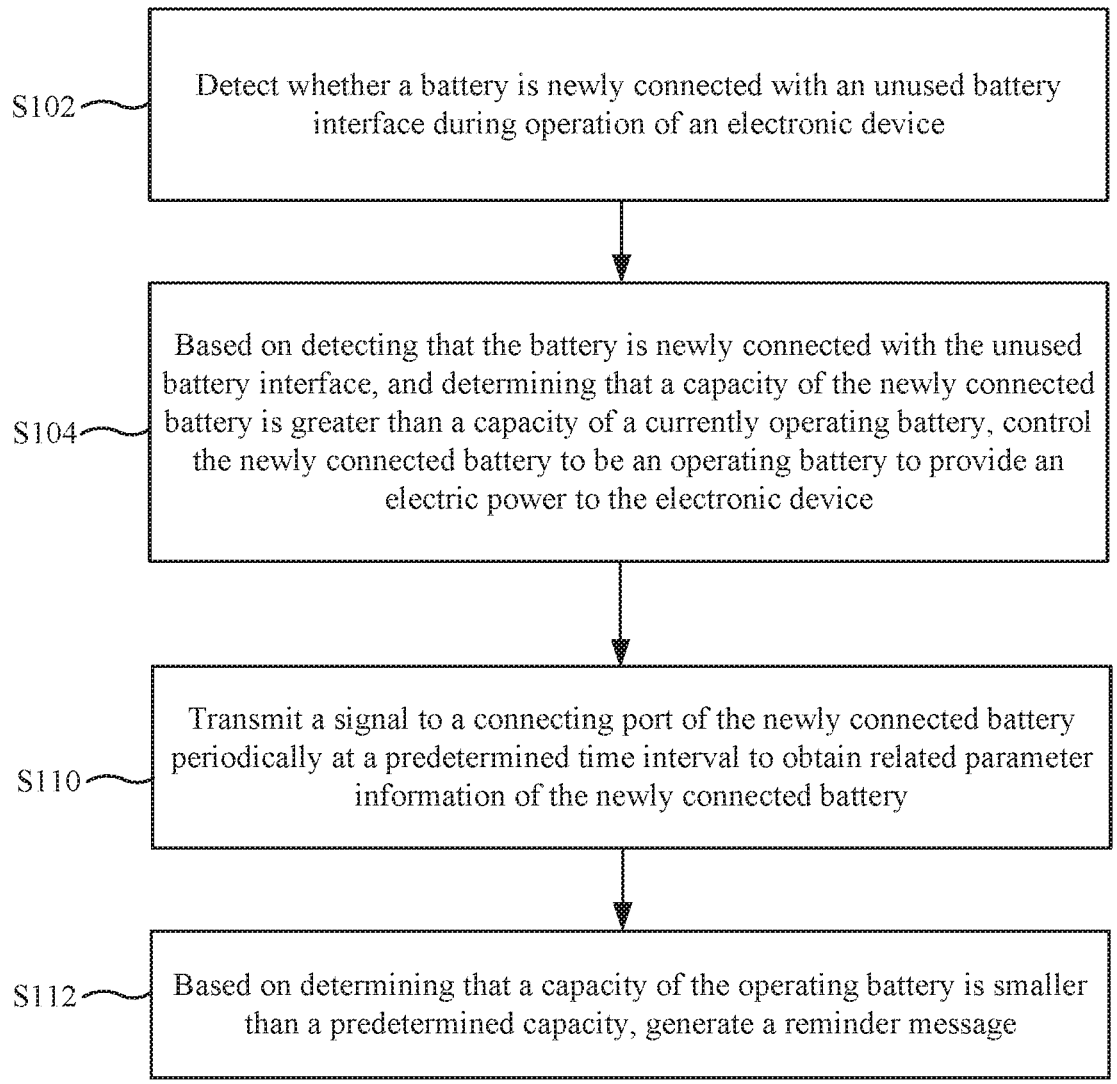
FIG. 8 is a flow chart illustrating a power supply method, according to another example embodiment.

Referring to FIG. 8, the power supply method may include:

S112: based on determining that a capacity of the operating battery is smaller than a predetermined capacity, generating a reminder message.

Referring back to FIG. 7, in some embodiments, the power supply device 100 may include a reminder processor 40 configured to generate the reminder message when the capacity of the operating battery obtained by the acquisition processor 30 is smaller than the predetermined capacity.

The reminder message may remind a user to timely replace a battery, thereby avoiding power supply interruption due to the capacity of the battery becoming too low, and/or further avoiding abnormal shut down of the electronic device due to the power loss.

In some embodiments, the reminder message may include at least one of a text message or an audio message. For example, the electronic device may include a display screen. When the capacity of the battery is low, the display screen may display a text message such as "battery capacity is too low." The audio message may include, for example, beeps generated by the electronic device.

Figure 9:
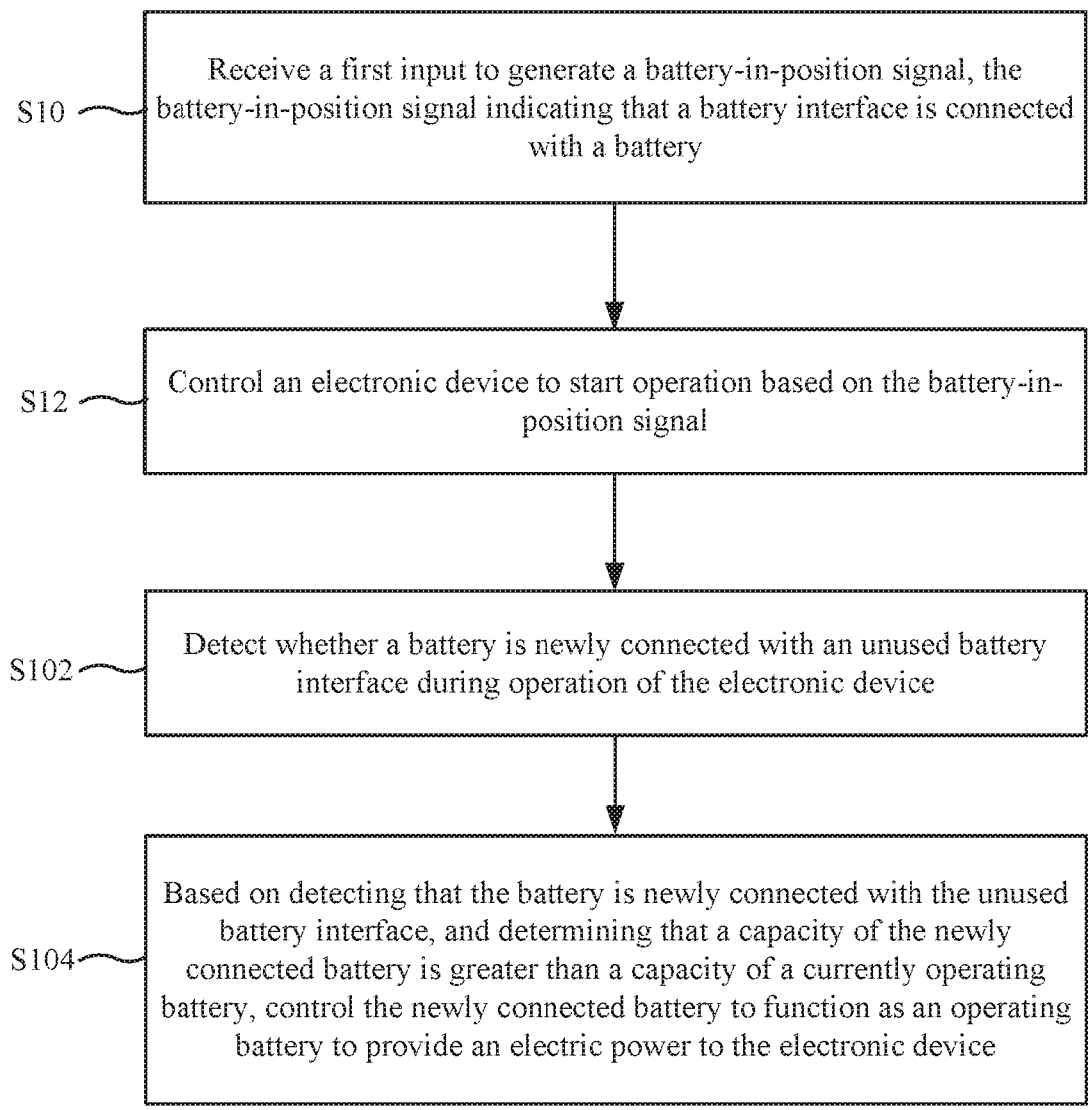
FIG. 9 is a flow chart illustrating a power supply method, according to another example embodiment.

Referring to FIG. 9, in some embodiments, the power supply method may also include:

S10: receiving a first input to generate a battery-in-position signal, the battery-in-position signal indicating that a battery interface is connected with a battery; and S12: controlling the electronic device to start operation based on the battery-in-position signal.

Referring back to FIG. 7, in some embodiments, the power supply device 100 may include a receiver 50 and a second controller 60. Step S10 may be executed by the receiver 50, and step S12 may be executed by the second controller 60.

In other words, the receiver 50 may be configured to receive the first input to generate the battery-in-position signal. The battery-in-position signal may indicate that a battery is connected to a battery interface. The second controller 60 may be configured to control the electronic device to start operation based on the battery-in-position signal.

As such, after starting the operation, the electronic device may execute related operations to satisfy a user's need.

Figure 10:
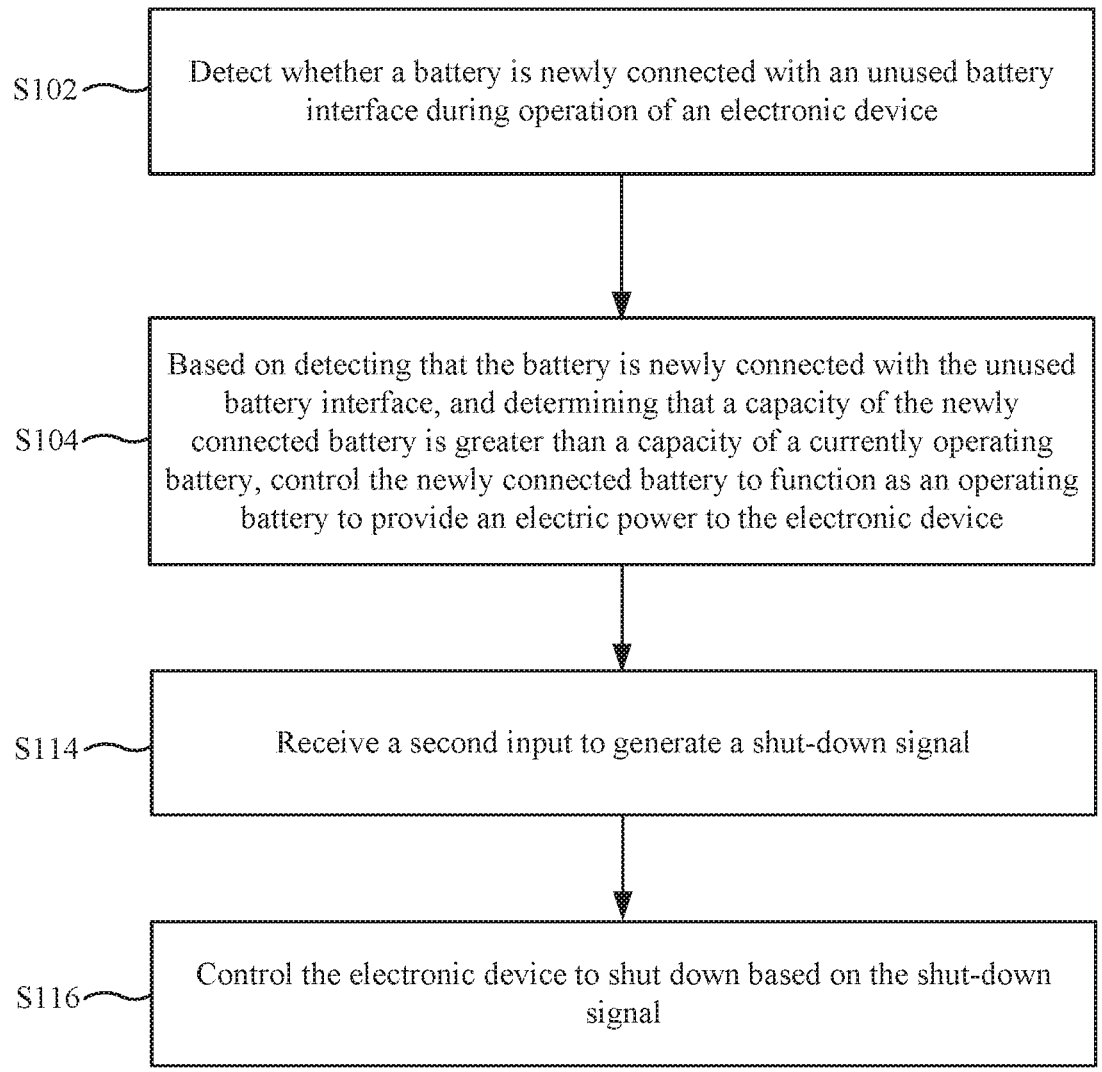
FIG. 10 is a flow chart illustrating a power supply method, according to another example embodiment.

Referring to FIG. 10, in some embodiments, the power supply method may include:

S114: receiving a second input to generate a shut-down signal; and

S116: controlling the electronic device to shut down based on the shut-down signal.

In some embodiments, step S114 may be executed by the receiver 50, and step S116 may be executed by the second controller 60. In other words, the receiver 50 may be configured to receive the second input to generate the shut-down signal. The second controller 60 may be configured to control the electronic device to shut down based on the shut-down signal.

In some embodiments, the electronic device may include a first switch and a second switch.

In some embodiments, step S10 may include: receiving the first input triggered by at least one of the first switch or the second switch to generate the battery-in-position signal.

In some embodiments, step S114 may include: receiving the second input triggered by at least one of the first switch or the second switch to generate the shut-down signal.

In some embodiments, the receiver 50 may be configured to receive the first input triggered by at least one of the first switch or the second switch to generate the battery-in-position signal. The receiver 50 may also be configured to receive the second input triggered by at least one of the first switch or the second switch to generate the shut-down signal.

In some embodiments, the first switch and the second switch may both be mechanical switches. In some embodiments, when the first switch or the second switch is first pressed, the electronic device may be started to operate. When the first switch or the second switch is pressed for the second time, the electronic device may be shut down. The first switch and the second switch are not limited to the mechanical switches, and may be other types, such as electrical switches. The present disclosure does not limit the type of switches for the first switch and the second switch.

In some embodiments, step S12 may include:

controlling the battery to output a voltage signal for a predetermined time period based on the battery-in-position signal; and controlling the electronic device to start operation based on the voltage signal.

In some embodiments, the second controller 60 may be configured to control the battery to output the voltage signal for the predetermined time period based on the battery-in-position signal, and may be configured to control the electronic device to start operation based on the voltage signal. For example, the predetermined time period may be 1-4 seconds, such as 2 seconds, 3 seconds, etc.

As such, the voltage signal may provide an electric power to at least some electrical components (e.g., a processor) to enable the electrical components to operate, thereby controlling the operating battery to constantly provide an electric power to the electronic device.

In some embodiments, step S12 may include:

stopping generating an additional battery-in-position signal after a first battery-in-position signal is generated; and controlling the electronic device to start operation based on the first battery-in-position signal.

Referring to FIG. 7, in some embodiments, the power supply device may include a third controller 70. The step of stopping generating an additional battery-in-position signal after a first battery-in-position signal is generated may be executed by the third controller 70. In other words, after the first battery-in-position signal is generated, the third controller 70 may be configured to stop generating any additional battery-in-position signal.

In some embodiments, the step of controlling the electronic device to start operation based on the first battery-in-position signal may be executed by the second controller 60. In other words, the second controller 60 may be configured to control the electronic device to start operation based on the first battery-in-position signal.

In some embodiments, when receiving the first input, multiple battery-in-position signals may be generated. In some embodiments, after a first battery-in-position signal is generated, the generation of an additional battery-in-position signal may be stopped, such that the electronic device may be started based on the first battery-in-position signal.

In some embodiments, the power supply method may include:

after the electronic device is controlled to start operation based on the first battery-in-position signal, transmitting verification information to the battery for performing a verification.

Referring to FIG. 7, in some embodiments, the power supply device 100 may include a verification processor 80. The step of after the electronic device is controlled to start operation based on the first battery-in-position signal, transmitting verification information to the battery for performing a verification, may be executed by the verification processor 80. In other words, the verification processor 80 may be configured to transmit verification information to the battery for performing a verification, after the electronic device is controlled to start operation based on the first battery-in-position signal.

The disclosed method and device may avoid malfunction of the electronic device or avoid reduction in operation life of the electronic device that may be caused by supplying power to the electronic device using a battery that does not satisfy a predetermined specification.

Figure 11:
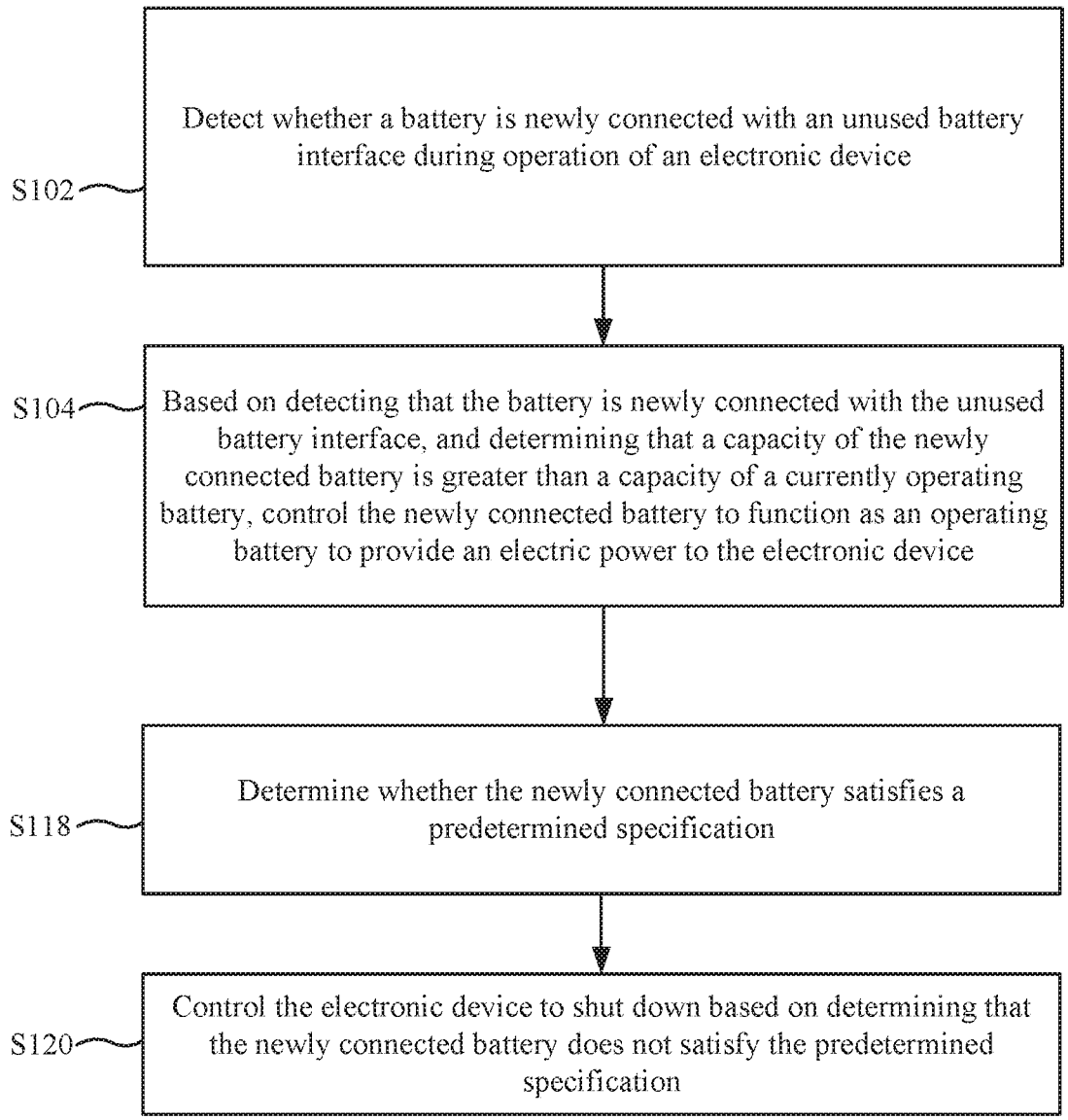
FIG. 11 is a flow chart illustrating a power supply method, according to another example embodiment.

Referring to FIG. 11, in some embodiments, the power supply method may include:

S118: determining whether the newly connected battery that is connected with a battery interface satisfies a predetermined specification; and S120: controlling the electronic device to shut down based on determining that the newly connected battery does not satisfy the predetermined specification.

Referring back to FIG. 7, in some embodiments, the power supply device 100 may include the verification processor 80. Step S118 may be executed by the verification processor 80, and step S120 may be executed by the second controller 60.

In other words, the verification processor 80 may be configured to determine whether the newly connected battery that is connected with the battery interface satisfies a predetermined specification. The second controller 60 may be configured to control the electronic device to shut down when the newly connected battery does not satisfy the predetermined specification.

The disclosed method and device may protect the electronic device in time to avoid damage to the electronic device. Examples of the battery that does not satisfy the predetermined specification may include: non-smart battery or counterfeit battery. A non-smart battery may not include a battery management system, and therefore, cannot manage the battery parameters.

In some embodiments, step S118 may be executed after step S104. In other embodiments, step S118 may be executed between steps S102 and S104.

In some embodiments, step S118 may include:

obtaining a total current received by the electronic device; and obtaining a reported current reported by all batteries connected with the electronic device, and comparing the reported current with the total current to determine whether a battery that does not satisfy the predetermined specification has been connected.

Referring to FIG. 7, the verification processor 80 may include an acquisition device 82 and a confirmation device 84. In some embodiments, the steps of obtaining a total current received by the electronic device and obtaining reported current from all batteries may be executed by the acquisition device 82. In some embodiments, the step of comparing the reported current with the total current to determine whether a battery that does not satisfy the predetermined specification has been connected, may be executed by the confirmation device 84.

In other words, the acquisition device 82 may be configured to obtain a total current received by the electronic device and obtain reported current from all batteries. The confirmation device 84 may be configured to compare the reported current with the total current to determine whether a battery that does not satisfy the predetermined specification has been connected.

In some embodiments, the battery that does not satisfy the predetermined specification may be a non-smart battery. A non-smart battery may not be configured to report its own current. For example, when the total current received by an electronic device is 2 A (i.e., Ampere), but the reported current from all of the batteries is only 1.5 A, then, the total current received by the electronic device is greater than the reported current from all batteries. Based on this comparison, it can be determined that at least one battery in all batteries connected with the electronic device is a battery that does not satisfy the predetermined specification.

In some embodiments, step S118 may include:

causing a battery to receive a first verification signal transmitted by the electronic device, and processing the first verification signal to obtain a second verification signal;

determining whether the second verification signal matches a predetermined verification signal; and determining that the battery does not satisfy the predetermined specification based on determining that the second verification signal does not match the predetermined verification signal.

Referring to FIG. 7, in some embodiments, the verification processor 80 may include a processing device 86. The step of causing a battery to receive a first verification signal transmitted by the electronic device, and processing the first verification signal to obtain a second verification signal, may be executed by the processing device 86.

In some embodiments, the step of determining whether the second verification signal matches a predetermined verification signal, may be executed by the confirmation device 84.

In other words, the processing device 86 may be configured to cause a battery to receive the first verification signal transmitted by the electronic device, and may process the first verification signal to obtain the second verification signal receive.

In some embodiments, the confirmation device 84 may be configured to determine whether the second verification signal matches a predetermined verification signal, and to determine that the battery does not satisfy the predetermined specification when the second verification signal does not match the predetermined verification signal.

In some embodiments, the first verification signal may include a second set of random numbers generated by encoding a first set of random numbers using a first predetermined encoding algorithm. The second verification signal may include a third set of random numbers generated by encoding the second set of random numbers using a second predetermined encoding algorithm. The predetermined verification signal may be a set of random numbers corresponding to the first set of random numbers. If the third set of random numbers matches the set of random numbers corresponding to the first set of random numbers, then it may be determined that the battery satisfies the predetermined specification, and hence, can continue to provide electric power to the electronic device.

Figure 12:
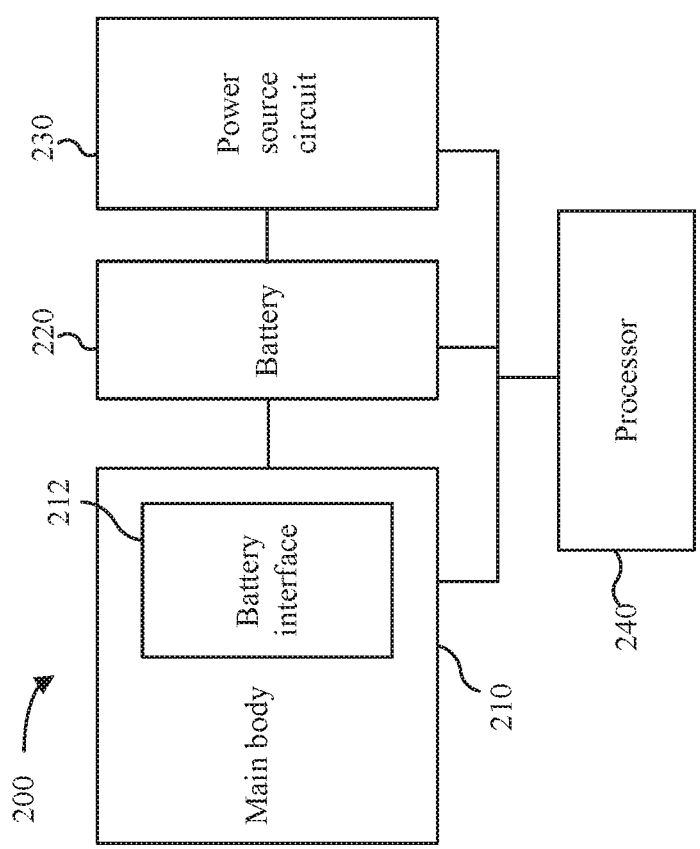
FIG. 12 is a schematic diagram of an electronic device, according to an example embodiment.

Referring to FIG. 12, the electronic device 200 of the present disclosure may include a main body 210, a power source circuit 230, and a processor 240. The electronic device 200 may be powered by a battery 220. The main body 210 may include a battery interface 212. In some embodiments, the main body 210 may include at least two battery interfaces 212. Each battery interface 212 may individually or independently provide electric power to the electronic device when the battery interface 212 is connected with an operating battery.

In some embodiments, the battery 220 may be detachably connected with the battery interface 212 to provide an electric power to the electronic device 200. The power source circuit 230 may provide electric power to the electronic device 200 through the battery 220.

In some embodiments, the processor 240 may be configured to detect whether an unused battery interface 212 is newly connected with a battery during the operation of the electronic device 200. When a battery is newly connected with an unused battery interface 212, and when a capacity of the newly connected battery is greater than a capacity of a currently operating battery, the processor 240 may be configured to control the newly connected battery to function as an operating battery to provide an electric power to the electronic device 200.

In some embodiments, when the currently operating battery of the electronic device 200 is to be replaced, the newly connected battery may provide electric power to the electronic device 200, such that the electronic device is not shut down when the battery 220 is being replaced. As a result, the continuity of data transmission may be maintained, and data loss may be avoided.

In some embodiments, when at least two batteries 220 are connected with the electronic device 200, and when one of the batteries 220 is removed, the processor 240 may be configured to control the remaining battery 220 to provide electric power to the electronic device 200.

As such, the remaining battery 220 may enable the electronic device 200 to continue operations.

In some embodiments, when the removed battery is an operating battery, the processor 240 may control a battery among the remaining batteries that has the greatest capacity to function as an operating battery to provide electric power to the electronic device 200.

As such, the operating time period of the electronic device 200 before the next battery replacement of the battery 220 may be extended.

In some embodiments, when the capacity of the newly connected battery is equal to the capacity of the currently operating battery, the processor 240 may be configured to control the newly connected battery and the currently operating battery to both function as operating batteries to provide electric power to the electronic device 200.

As such, multiple batteries 220 may simultaneously provide electric power to the electronic device 200, thereby increasing the continuous operation capability of the electronic device 200.

In some embodiments, when a capacity of an operating battery reduces to be the same as (or equal to) a capacity of one or more remaining batteries 220 connected with the electronic device 200, the processor 240 may be configured to control a plurality of batteries 220 having the same capacity (e.g., all of the batteries 220 having the same capacity) to function as operating batteries to provide electric power to the electronic device.

As such, multiple batteries 220 may simultaneously provide electric power to the electronic device 200, thereby increasing the continuous operation capability of the electronic device 200.

In some embodiments, the processor 240 may be configured to transmit a signal to a connecting port of a battery 220 periodically at a predetermined time interval to obtain parameter information related to the battery 220.

As such, the operation status of the battery 220 may be monitored at any time to control the discharge of the battery 220 or to stop the discharge.

In some embodiments, the electronic device 200 may include a reminder device. The reminder device may be configured to generate a reminder message when a capacity of the operating battery obtained by the processor 240 becomes smaller than a predetermined capacity.

As such, the reminder message may remind a user in time to replace the battery 220 to avoid the situation in which the battery 220 cannot provide the electric power to the electronic device 200 due to insufficient capacity remaining in the battery 220, which may result in an abnormal shut down of the electronic device 200 due to power loss.

In some embodiments, the processor 240 may be configured to receive a first input to generate a battery-in-position signal for the battery 220. The battery-in-position signal indicates that the battery 220 is connected with the battery interface 212. The processor 240 may also be configured to control the electronic device to start operation based on the battery-in-position signal of the battery 220.

As such, after being started, the electronic device 220 may execute operations that satisfy a user's needs.

In some embodiments, the processor 240 may also be configured to receive a second input to generate a shut-down signal and may control the electronic device 200 to shut down based on the shut-down signal.

As such, the electronic device 200 may be shut down after performing certain operations. As a result, battery power consumption may be reduced. In addition, the operating time of the electronic device 200 may be reduced. Accordingly, the operation life time of the electronic device 200 may be ensured.

In some embodiments, the electronic device 200 may include a first switch 252 and a second switch 254. The processor 240 may be configured to receive the first input triggered by at least one of the first switch 252 or the second switch 254 to generate a battery-in-position signal for the battery 220.

In some embodiments, the processor 240 may be configured to receive the second input triggered by at least one of the first switch 252 or the second switch 254 to generate a shut-down signal.

As such, the electronic device 200 may be operated through multiple switches, which makes it convenient for the user to operate the electronic device 200.

Figure 13:
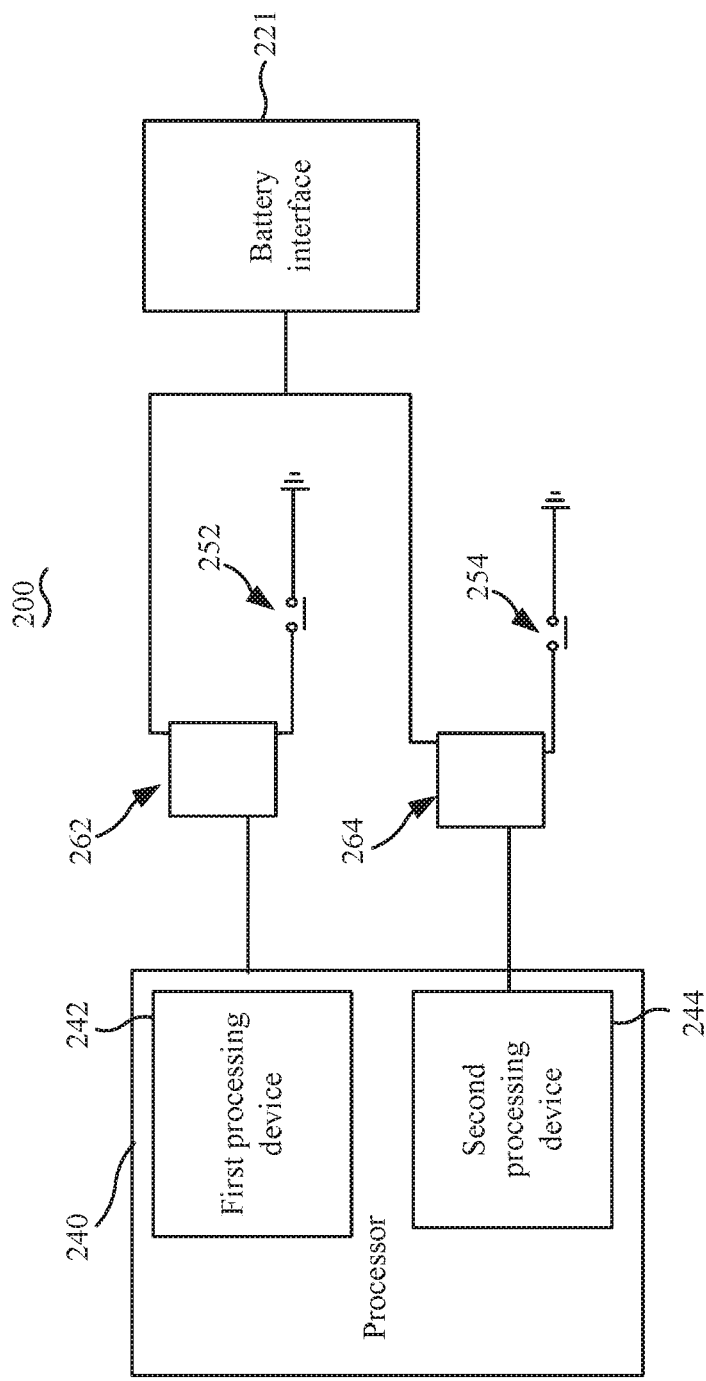
FIG. 13 is a schematic diagram of an electronic device, according to another example embodiment.

Referring to FIG. 13, in some embodiments, the electronic device 200 may include a first transistor 262 and a second transistor 264. The processor 240 may include a first processing device 242 and a second processing device 244. A gate terminal of the first transistor 262 may be connected with the first processing device 242, and a drain terminal of the first transistor 262 may be connected with an end of the first switch 252. The other end of the first switch 252 may be connected to the ground.

In some embodiments, a gate terminal of the second transistor 264 may be connected with the second processing device 244. A drain terminal of the second transistor 264 may be connected with an end of the second switch 254. The other end of the switch 254 may be connected to the ground. A source terminal of the first transistor 262 and a source terminal of the second transistor 264 may be connected with the battery interface 212.

Next, the operation of the first switch 252 will be explained. When the battery 220 is "in position," i.e., when the battery 220 is connected to the battery interface 212, and when the first switch 252 is not pressed, the source terminal and the drain terminal of the first transistor 262 may be connected. The battery interface 212 may output a high voltage signal. When the first switch 252 is pressed, the first switch 252 is connected to the ground, and the battery interface 212 is also connected to the ground through the first switch 252, such that the battery interface 212 outputs a low voltage signal. A person having ordinary skills in the art can appreciate that the high and low voltage signals can be defined based on actual needs. Based on the low voltage signal, the first processing device 242 may determine that the battery 220 is "in position." When the drain terminal of the first transistor 262 is connected to the ground, due to the property of transistors, the source terminal and the drain terminal of the first transistor 262 are disconnected, such that the battery interface 212 is not connected to the ground. Then output signal of the battery interface 212 changes from a low voltage signal to a high voltage signal, such that the first processing device 242 may control the battery 220 to provide electric power to the electronic device 200.

In some embodiments, when the first switch 252 is pressed, the output voltage signal of the battery interface 212 becomes a low voltage signal. The battery 220 and the electronic device 200 are connected, and the electronic device 200 may receive the "battery-in-position" signal. A controller of the electronic device 200, such as a microcontroller ("MCU") may control components such as transistors to disconnect the battery interface 212 from the first switch 252. The voltage of the output of the battery interface 212 may continue to reduce, thereby causing anomaly.

In some embodiments, the processor 240 may realize the above-described functions through other electrical components, such as a control circuit.

In some embodiments, based on the battery-in-position signal related to the battery 220, the processor 240 may control an operating battery to output a voltage signal for a predetermined time period. The processor 240 may also be configured to control the electronic device 200 to start operation based on the voltage signal. In some embodiments, the predetermined time period may be 1-4 seconds.

As such, the voltage signal may power certain electric components (e.g., the processor 240) of the electronic device 200, such that these electric components may start operating, and may control the operating battery to continuously provide the electric power to the electronic device 200.

In some embodiments, after the processor 240 controls the electronic device 200 to start operation based on the battery-in-position signal related to the battery 220, the processor 240 may transmit verification information to the battery 220 for performing a verification.

As such, the disclosed method and device can avoid malfunction of the electronic device or reduction in operation life of the electronic device that may be caused by supplying power to the electronic device using a battery that does not satisfy a predetermined specification.

In some embodiments, the processor 240 may be configured to determine whether the battery 220 connected with the battery interface 212 does not satisfy the predetermined specification.

In some embodiments, the processor 240 may be configured to control the electronic device to shut down when determining that the battery 220 does not satisfy the predetermined specification.

As such, the disclosed method and device may protect the electronic device 200 in time, avoiding damages to the electronic device. Examples of the battery that does not satisfy the predetermined specification may include: non-smart battery or counterfeit battery. A non-smart battery may not include a battery management system, and therefore, cannot manage the parameters of the battery 220.

In some embodiments, the processor 240 may be configured to obtain a total current received by the electronic device, and to obtain a reported current reported by all of the batteries connected to the electronic device.

In some embodiments, the processor 240 may be configured to compare the reported current with the total current, and determine whether a battery that does not satisfy the predetermined specification has been connected.

In some embodiments, the processor 240 may be configured to cause the battery 220 to receive a first verification signal. The processor 240 may be configured to process the first verification signal to obtain a second verification signal.

In some embodiments, the processor 240 may be configured to determine whether the second verification signal matches a predetermined verification signal, and to determine whether the battery 220 does not satisfy the predetermined specification when determining that the second verification signal does not match the predetermined verification signal.

Figure 14:
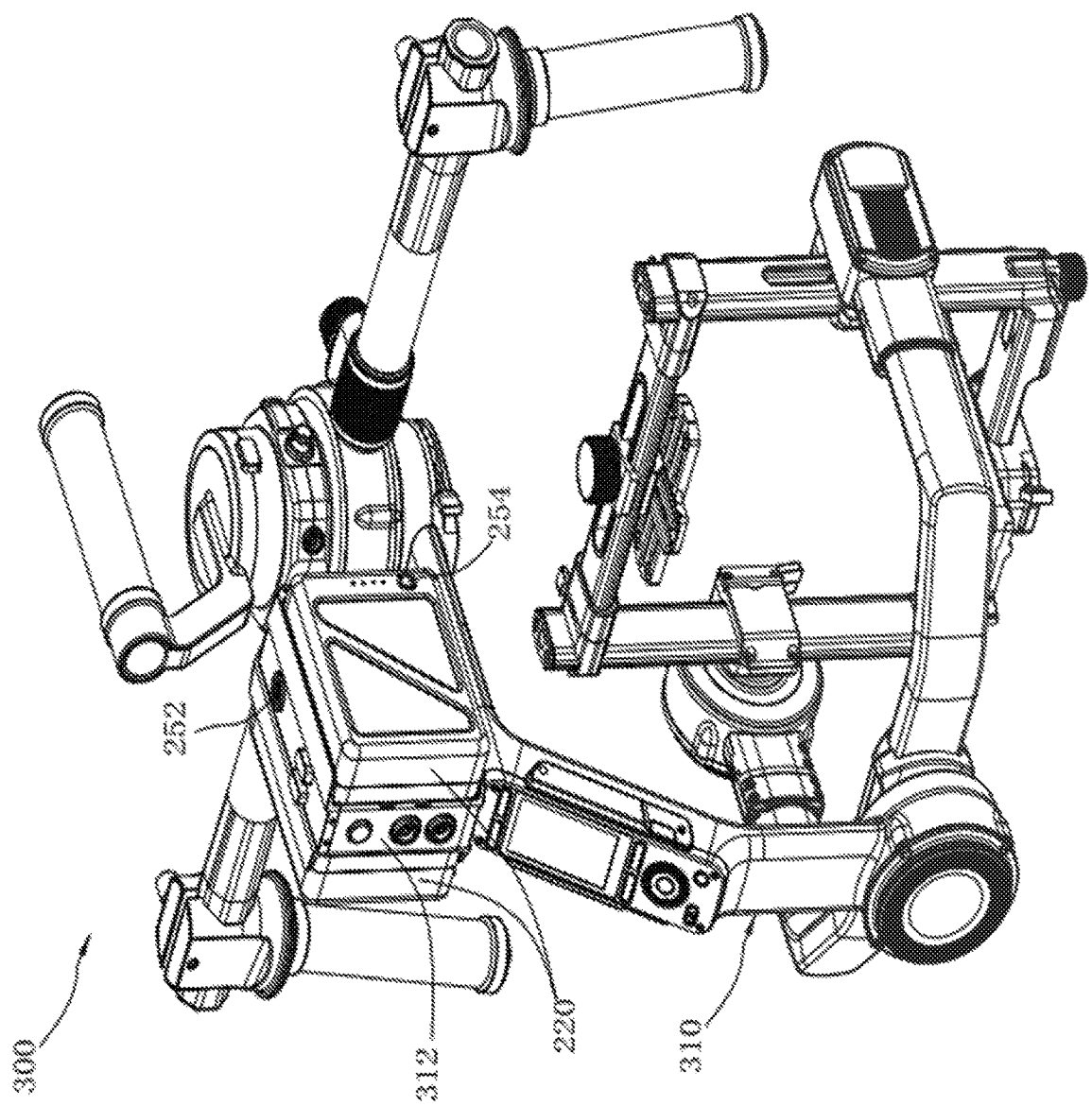
FIG. 14 is a perspective view of a gimbal, according to an example embodiment.

Referring to FIG. 14, in some embodiments, the electronic device 200 may be a gimbal 300. The gimbal 300 may be a supporting device configured for mounting or fixing an imaging device. The gimbal 300 may adjust the yaw and pitch angles such that the imaging device can capture high quality images.

In some embodiments, the main body 210 may include a gimbal support frame 310. At least two battery interface 212 may be provided on the gimbal support frame 310. In some embodiments, the battery 220 may be provided on the gimbal support frame 310. In some embodiments, the battery 220 may be connected with the battery interface 212 through a cable.

In some embodiments, the gimbal support frame 310 may include a battery seat 312. At least two battery interfaces 212 may be formed on the battery seat 312. The battery 220 may be inserted onto the battery seat 312. As such, the battery seat 312 may render the installation and detachment of the battery 220 convenient. The size of the battery seat 312 may be determined based on the size of the gimbal 300. The battery 220 may be stably fixed onto the battery seat 312.

In some embodiments, the gimbal 300 may include the first switch 252 and the second switch 254. The first switch 252 and/or the second switch 254 may be provided on the gimbal support frame 310 or the battery 220. For example, in some embodiments, the first switch 252 and the second switch 254 may both be provided on the gimbal 300 or may both be provided on the battery 220. In some embodiments, the first switch 252 may be provided on the gimbal 300, and the second switch 254 may be provided on the battery 220. In some embodiments, the second switch 254 may be provided on the gimbal 300, and the first switch 252 may be provided on the battery 220.

In some embodiments, the first switch 252 may be provided on the gimbal 300, and the second switch 254 may be provided on the battery 220. The first switch 252 and the second switch 254 may both be mechanical switches. The first switch 252 or the second switch 254 may be triggered to control the start up or shut down of the gimbal 300. In other words, when a user operates the first switch 252 or the second switch 254, the user may control the start up or the shut down of the gimbal 300.

The above descriptions of the embodiments of the power supply device may be applicable to the electronic device 200. Descriptions of other elements or embodiments of the electronic device 200 may refer to the above descriptions of the power supply device.

In some embodiments, the present disclosure also provides a power supply method for the gimbal 300. The gimbal 300 may be powered by the battery 220. In some embodiments, the gimbal 300 may include at least two battery interfaces. The gimbal 300 may use any of the above-described power supply method to receive electric power.

It should be understood that in the present disclosure, relational terms such as first and second, etc., are only used to distinguish an entity or operation from another entity or operation, and do not necessarily imply that there is an actual relationship or order between the entities or operations. Therefore, a "first" or "second" feature may include, explicitly or implicitly, one or more such features. The term "multiple" means two or more than two, unless otherwise defined.

The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . . . . " does not exclude inclusion of another same item in the process, method, apparatus, or device that includes the item.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless.

When a first component is referred to as "disposed," "located," or "provided" on a second component, the first component may be directly disposed, located, or provided on the second component or may be indirectly disposed, located, or provided on the second component via an intermediate component. The term "on" does not necessarily mean that the first component is located higher than the second component. In some situations, the first component may be located higher than the second component. In some situations, the first component may be disposed, located, or provided on the second component, and located lower than the second component. In addition, when the first item is disposed, located, or provided "on" the second component, the term "on" does not necessarily imply that the first component is fixed to the second component. The connection between the first component and the second component may be any suitable form, such as secured connection (fixed connection) or movable contact.

When a first component is referred to as "disposed," "located," or "provided" in a second component, the first component may be partially or entirely disposed, located, or provided in, inside, or within the second component. When a first component is coupled, secured, fixed, or mounted "to" a second component, the first component may be is coupled, secured, fixed, or mounted to the second component from any suitable directions, such as from above the second component, from below the second component, from the left side of the second component, or from the right side of the second component.

The terms "perpendicular," "horizontal," "left," "right," "up," "upward," "upwardly," "down," "downward," "downwardly," "outward," "outwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure.

In addition, the singular forms "a," "an," and "the" are intended to include the plural forms as well, unless the context indicates otherwise. And, the terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

The following embodiments do not limit the sequence of execution of the steps included in the disclosed methods. The sequence of the steps may be any suitable sequence, and certain steps may be repeated.

The present disclosure provides various implementation methods or examples to realize the disclosed methods and devices. For simplicity, the above described specific examples of the parts and devices. They are only for illustration purposes and are not intended to limit the scope of the present disclosure. In addition, in different embodiments, the same reference number or reference characters may be used. Such repetition is only for simplicity and illustration, and does not necessarily indicate any relationship between the different embodiments of the disclosed methods and devices. In addition, the present disclosure provides examples of the manufacturing processes and materials. A person having ordinary skills in the art can appreciate that other manufacturing processes and/or materials may also be used.

In the descriptions, terms such as "an embodiment," "some embodiments," "example embodiments," "example," "illustration," or "specific example," or "some examples," are used to describe that the feature, structure, material, or characteristics may include at least one example or embodiment. In the descriptions, the use of the illustrative expressions does not necessarily indicate that the implementation methods or examples are the same. In addition, the specific feature, structure, material, or characteristics may be combined in any suitable manner in one or more embodiment.

A process or method shown in a flow chart or described in any other form may represent one or more module, segments, or parts of computer-executable codes for realizing specific logical functions or for executing specific steps. Other implementations of the disclosed methods or functions may also be included in the present disclosure. Steps of the processes do not necessarily have to be executed in the order shown in the flow chart or as described. Other orders or sequences, such as simultaneous execution or execution in reverse order may be adopted based on the functions to be realized. A person having ordinary skills in the art can understand that the present disclosure is not limited to the illustrative order of the steps.

The logic or steps shown in the flow chart or otherwise described in the specification may be regarded as representation of a list of computer-executable codes for realizing certain logic functions. The computer-executable codes may be embedded or encoded in a computer-readable storage medium. The computer-readable storage medium may be used by code-executing system, apparatus, or device (e.g., a computer-based system, a system having a processing device or a processor, or other systems that can read and execute codes from a code-executing system, apparatus, or device). The computer-readable medium may be used in combination with the code-executing system, apparatus, or device. In the present disclosure, the term "computer-readable medium" refers to a non-transitory device that may include, store, communicate, broadcast, or transmit computer program code for the code-executing system, apparatus, or device to execute, or may be any device that may be used with the code-executing system, apparatus, or device. The non-transitory computer-readable storage medium may include one or more of: an electrical connector having one or more wiring layouts (e.g., electronic device, a portable computer disk case (e.g., magnetic device), a random access memory ("RAM"), a read-only memory ("ROM"), an Electrically Programmable read only memory ("EPROM" or a flash memory), an optical device, or a Compact Disc-ROM ("CDROM"). In some embodiments, the computer-readable medium may include a paper or other suitable medium printed with a computer program. The paper or other suitable medium may be optically scanned, edited, interpreted, or processed using other methods to obtain the computer program electronically, which may be stored in a computer storage medium.

A person having ordinary skills in the art can appreciate that part or all of the above disclosed methods and processes may be implemented using related electrical hardware, computer software, firmware, or a combination thereof. In the above embodiments, multiple steps or methods may be realized using software or firmware stored in the computer-readable storage medium and executable by a suitable code-executing system. For example, if the disclosed methods and processes are implemented using hardware, the hardware may include at least one of the following: a discrete logic circuit having a logic gate circuit that may be configured to perform logic functions for digital signals, an application specific integrated circuit having suitable combinations of logic gate circuits, a programmable gate array ("PGA"), a field programmable gate array ("FPGA"), etc.

A person having ordinary skills in the art can appreciate that some or all of the steps of the disclosed methods may be performed by hardware under the instruction of computer software. The computer software may be stored in a computer-readable storage medium. When the computer software is executed, at least one of the disclosed steps or a combination of the disclosed steps may be performed.

Various functional units or components may be integrated in a single processing unit, or may exist as separate physical units or components. In some embodiments, two or more units or components may be integrated in a single unit or component. The integrated unit may be realized using hardware or a combination of hardware and software. If the integrated units are realized as software functional units and sold or used as independent products, the integrated units may be stored in a computer-readable storage medium.

The above-mentioned storage medium may include a read-only memory, a magnetic disk, or an optical disk, etc.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A power supply method, comprising:
   detecting whether a battery is newly connected to an unused battery interface of an electronic device during operation of the electronic device;
   based on detecting that the battery is newly connected to the unused battery interface, and determining that a capacity of the newly connected battery is greater than or equal to a capacity of a currently operating battery, controlling the newly connected battery to function as an operating battery to provide an electric power to the electronic device;
   determining whether the newly connected battery does not satisfy a predetermined specification, including determining whether the newly connected battery includes at least one of a non-smart battery or a counterfeit battery; and
   controlling the electronic device to shut down in response to a determination that the newly connected battery does not satisfy the predetermined specification, the determination that the newly connected battery does not satisfy the predetermined specification including a determination that the newly connected battery includes the at least one of the non-smart battery or the counterfeit battery.

2. The power supply method of claim 1, further comprising:
   based on detecting that at least two batteries are connected with the electronic device and then one of the at least two batteries is removed, controlling one or more remaining batteries to provide the electric power to the electronic device.

3. The power supply method of claim 2, wherein based on the detection that at least two batteries are connected with the electronic device and then one of the at least two batteries is removed, controlling the one or more remaining batteries to provide the electric power to the electronic device comprises:
   based on determining that the one of the at least two batteries that is removed is an operating battery, controlling a battery in the one or more remaining batteries that has the greatest capacity to function as an operating battery to provide the electric power to the electronic device.

4. The power supply method of claim 1, further comprising:

based on determining that the capacity of the newly connected battery is equal to the capacity of the currently operating battery, controlling the newly connected battery and the currently operating battery to both function as operating batteries to provide the electric power to the electronic device; and/or based on detecting that a capacity of the operating battery reduces to be equal to a capacity of one or more batteries connected with the electronic device, controlling a plurality of batteries having the same capacity to function as operating batteries to provide the electric power to the electronic device.

5. The power supply method of claim 1, further comprising:
receiving a first input to generate a battery-in-position signal, the battery-in-position signal indicating that a battery is connected to the electronic device; and
controlling the electronic device to start operation based on the battery-in-position signal.

6. The power supply method of claim 5, further comprising:
receiving a second input to generate a shut-down signal; and
controlling the electronic device to shut down based on the shut-down signal.

7. The power supply method of claim 1, wherein determining whether the newly connected battery does not satisfy a predetermined specification further comprises:
obtaining a total current received by the electronic device;
obtaining a reported current reported by all batteries connected with the electronic device; and
comparing the reported current with the total current to determine whether the newly connected battery does not satisfy the predetermined specification.

8. The power supply method of claim 1, wherein determining whether the newly connected battery does not satisfy a predetermined specification further comprises:
causing the newly connected battery to receive a first verification signal transmitted by the electronic device, and processing the first verification signal to obtain a second verification signal;
determining whether the second verification signal matches a predetermined verification signal; and
determining that the newly connected battery does not satisfy the predetermined specification based on determining that the second verification signal does not match the predetermined verification signal.

9. An electronic device, comprising:
a main body comprising at least two battery interfaces, each battery interface configured to provide an electric power to the electronic device when connected with an operating battery; and
a power source circuit and a processor both disposed within the main body, the power source circuit configured to provide the electric power to the electronic device through the operating battery,
wherein the processor is configured to:
detect whether a battery is newly connected to an unused battery interface of the at least two battery interfaces during operation of the electronic device; and
based on detecting that the battery is newly connected to the unused battery interface, control the newly connected battery to function as the operating battery to provide the electric power to the electronic device based on determining that a capacity of the newly connected battery is greater than or equal to a capacity of a currently operating battery;
determine whether the newly connected battery does not satisfy a predetermined specification, including determining whether the newly connected battery includes at least one of a non-smart battery or a counterfeit battery; and
control the electronic device to shut down in response to a determination that the newly connected battery does not satisfy the predetermined specification, the determination that the newly connected battery does not satisfy the predetermined specification including a determination that the newly connected battery includes the at least one of the non-smart battery or the counterfeit battery.

10. The electronic device of claim 9, wherein
the at least two battery interfaces are connected with at least two batteries, and
wherein based on detecting that one of the at least two batteries is removed, the processor is further configured to control one or more remaining batteries of the at least two batteries to provide the electric power to the electronic device.

11. The electronic device of claim 10, wherein based on determining that the one battery that is removed is an operating battery, the processor is further configured to control a battery included in the one or more remaining batteries that has the greatest capacity to function as an operating battery to provide the electric power to the electronic device.

12. The electronic device of claim 9,
wherein based on determining that the capacity of the newly connected battery is equal to the capacity of the currently operating battery, the processor is further configured to control the newly connected battery and the currently operating battery to both function as operating batteries to provide the electric power to the electronic device, and/or
wherein based on determining that a capacity of the operating battery reduces to be equal to a capacity of one or more remaining batteries connected with the electronic device, the processor is further configured to control a plurality of batteries having the same capacity to function as operating batteries to provide the electric power to the electronic device.

13. The electronic device of claim 9,
wherein the processor is further configured to receive a first input to generate a battery-in-position signal, the battery-in-position signal indicating that a battery is connected to one of the at least two battery interfaces, and
wherein the processor is further configured to control the electronic device to start the operation based on the battery-in-position signal.

14. The electronic device of claim 13, wherein the processor is further configured to receive a second input to generate a shut-down signal, and to control the electronic device to shut down based on the shut-down signal.

15. The electronic device of claim 9, wherein the processor is further configured to:
obtain a total current received by the electronic device, and obtain a reported current reported by all batteries connected with the electronic device; and
compare the reported current with the total current to determine whether the newly connected battery does not satisfy a predetermined specification.

16. The electronic device of claim 9, wherein the processor is further configured to:
- cause the newly connected battery to receive a first verification signal transmitted by the electronic device;
- process the first verification signal to obtain a second verification signal;
- determine whether the second verification signal matches a predetermined verification signal; and
- determine that the newly connected battery does not satisfy the predetermined specification based on a determination that the second verification signal does not match the predetermined verification signal.

17. The electronic device of claim 9,
wherein the electronic device comprises a gimbal, and/or
wherein the main body comprises a gimbal support frame, the at least two battery interfaces are disposed on the gimbal support frame, and batteries are disposed on the gimbal support frame and are connected with the at least two battery interfaces through a cable.

18. The electronic device of claim 17,
wherein the gimbal support frame comprises a battery seat, the at least two battery interfaces are formed on the battery seat, and the batteries are inserted onto the battery seat, and/or
wherein
- the gimbal comprises a first switch and a second switch,
- at least one of the first switch or the second switch is disposed on the gimbal support frame or on at least one of the batteries, and
- at least one of the first switch or the second switch is configured to be triggered to control start up or shut down of the gimbal.

* * * * *